H. A. HUMPHREY.
APPARATUS FOR UTILIZING AN EXPANSIVE FORCE.
APPLICATION FILED OCT. 21, 1911. RENEWED JULY 24, 1917.

1,258,570.

Patented Mar. 5, 1918.
7 SHEETS—SHEET 1.

WITNESSES

INVENTOR
Herbert Alfred Humphrey

BY

ATTORNEY

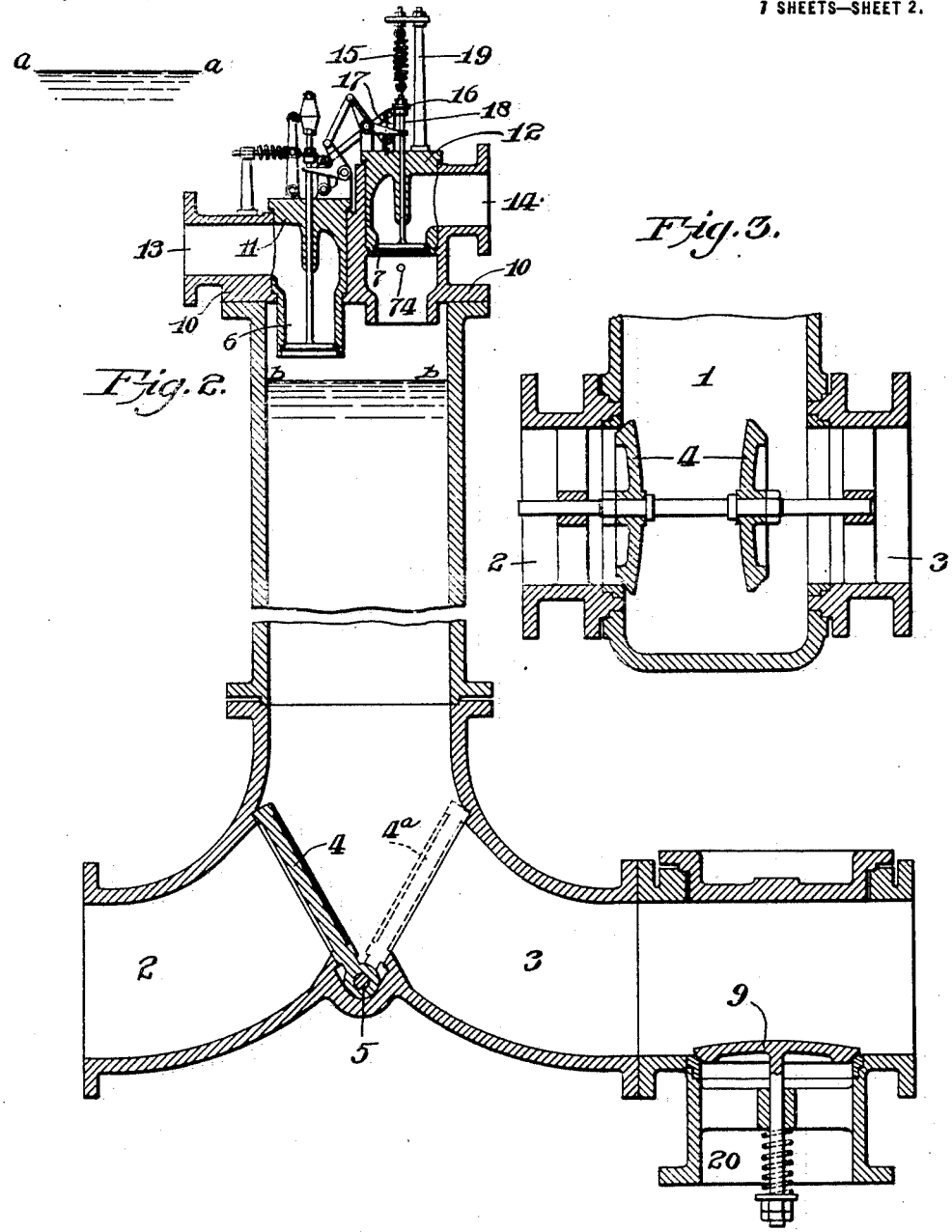

H. A. HUMPHREY.
APPARATUS FOR UTILIZING AN EXPANSIVE FORCE.
APPLICATION FILED OCT. 21, 1911. RENEWED JULY 24, 1917.

1,258,570.

Patented Mar. 5, 1918.
7 SHEETS—SHEET 3.

INVENTOR
Herbert Alfred Humphrey
By Jno. R. Coasdale
ATTORNEY

WITNESSES
Mae Hofmann
Howard B. Okie

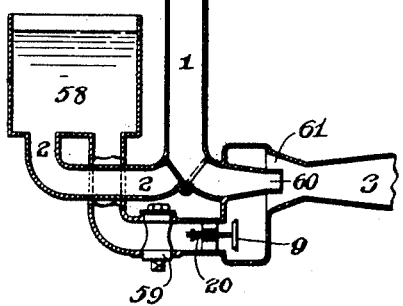
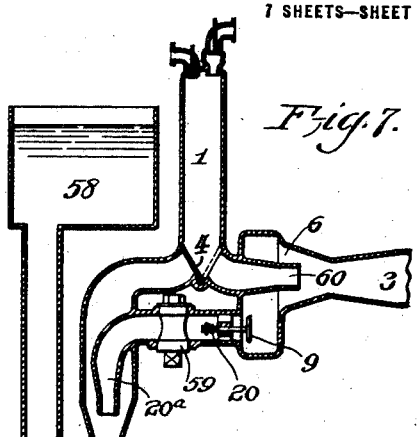
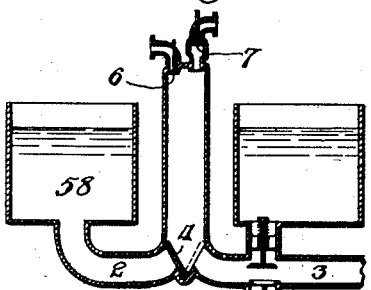
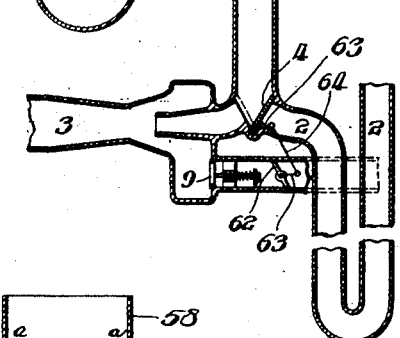
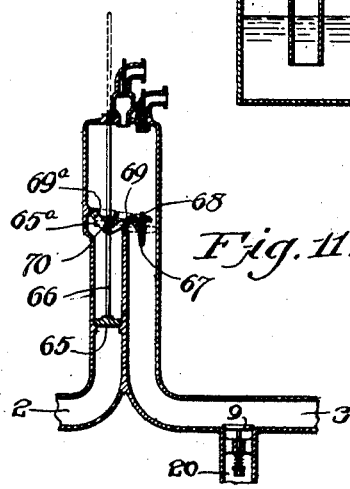
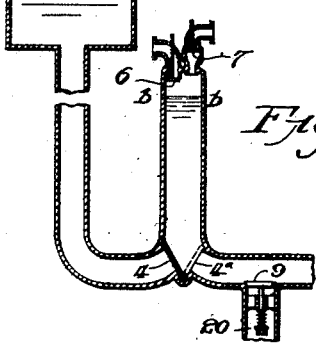

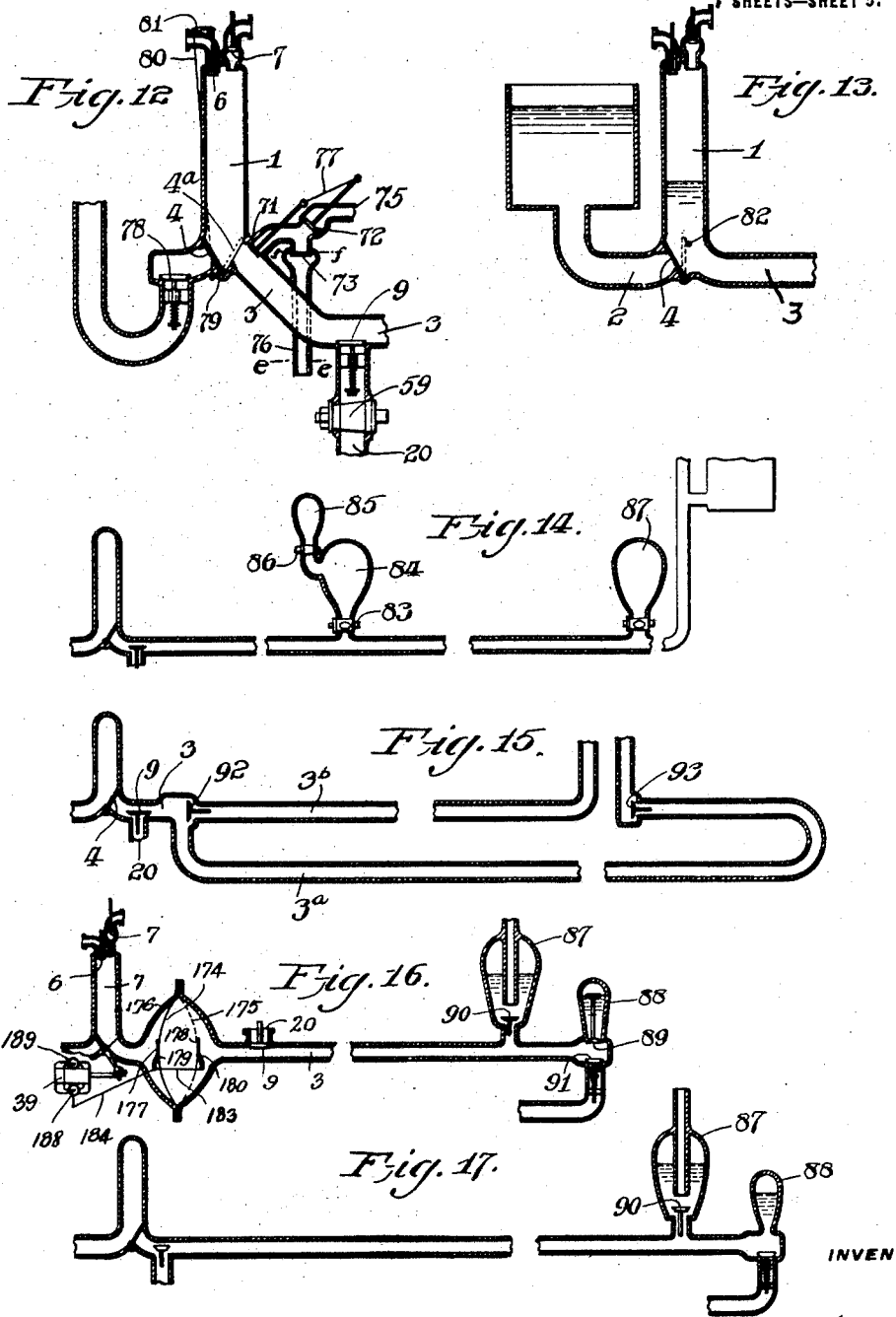

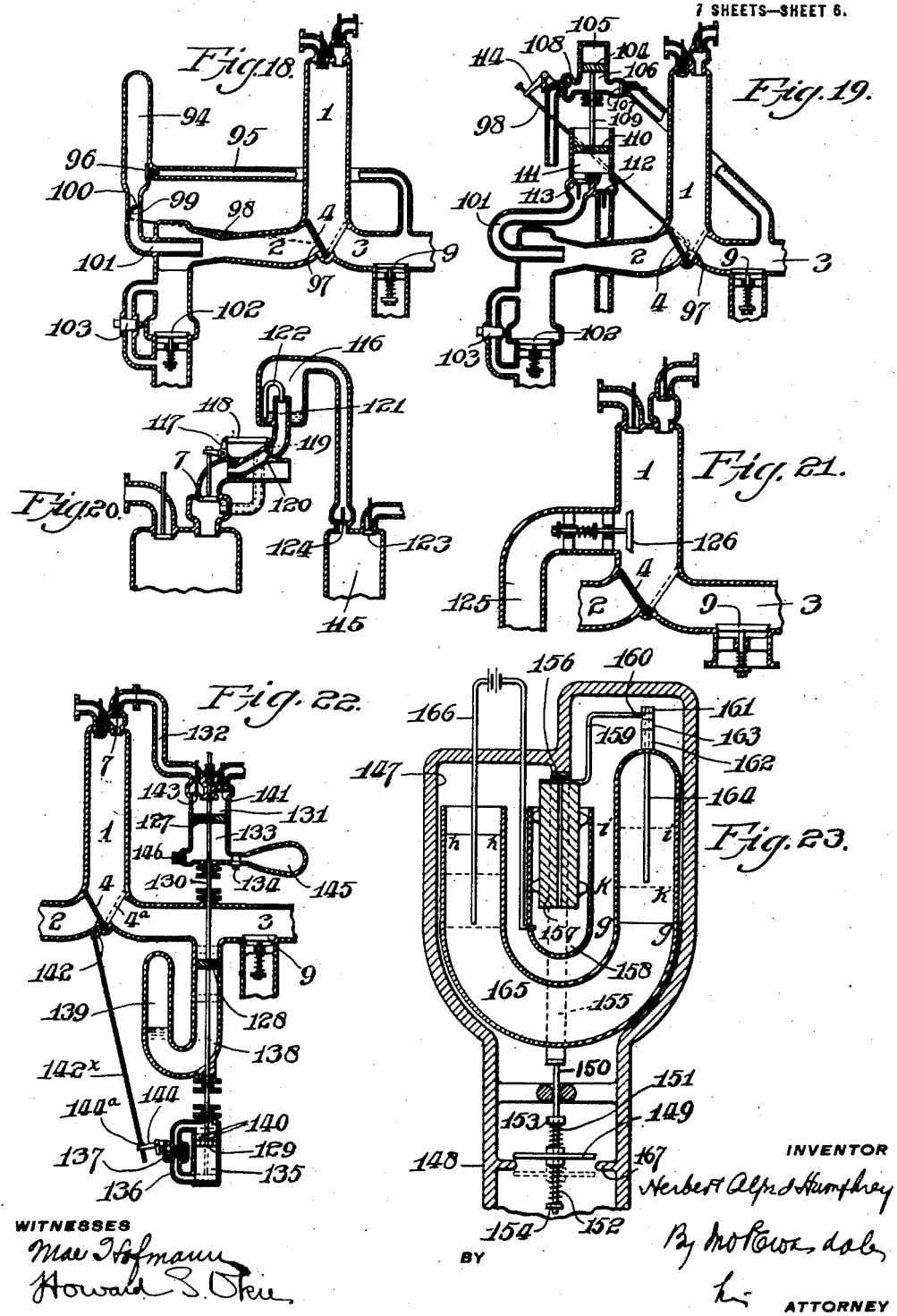

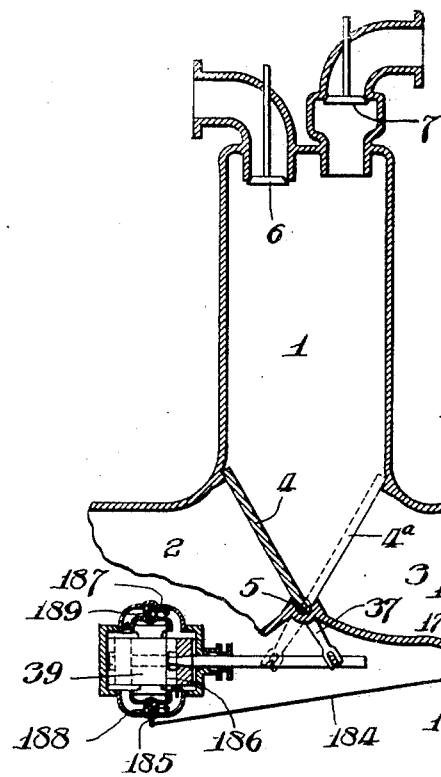
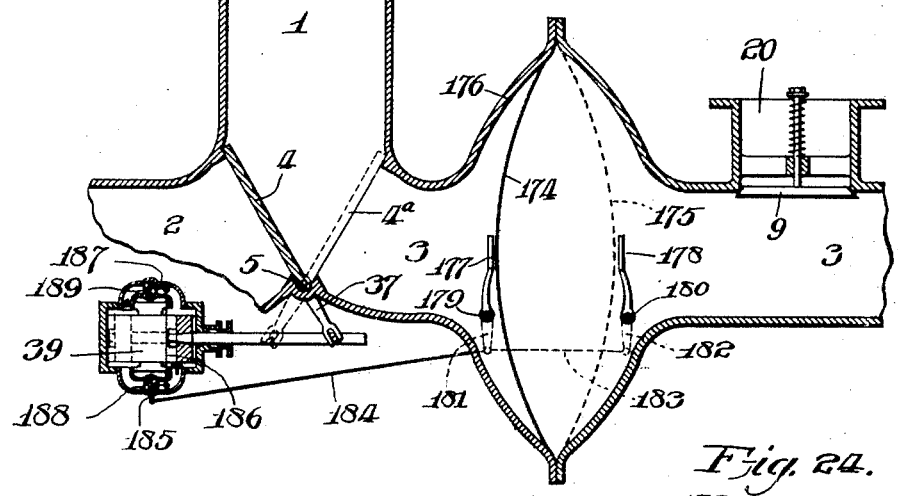
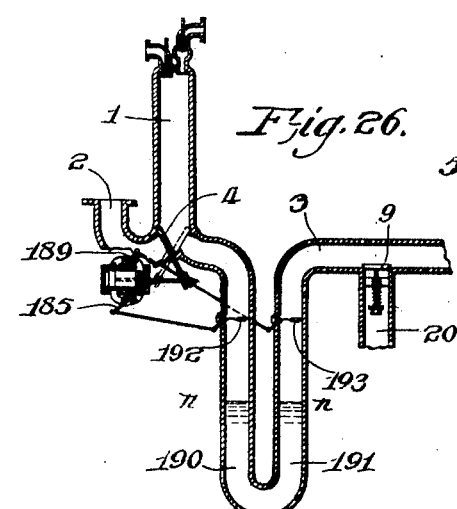
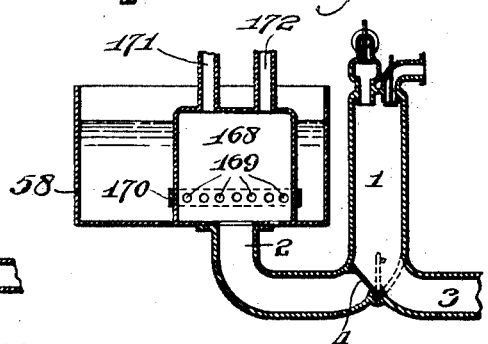

UNITED STATES PATENT OFFICE.

HERBERT ALFRED HUMPHREY, OF LONDON, ENGLAND, ASSIGNOR TO HUMPHREY GAS PUMP COMPANY, A CORPORATION OF NEW YORK.

APPARATUS FOR UTILIZING AN EXPANSIVE FORCE.

1,258,570.  Specification of Letters Patent.  Patented Mar. 5, 1918.

Original application filed June 13, 1908, Serial No. 438,425. Divided and this application filed October 21, 1911, Serial No. 655,973. Renewed July 24, 1917. Serial No. 182,585.

*To all whom it may concern:*

Be it known that I, HERBERT ALFRED HUMPHREY, a subject of the King of Great Britain, residing in London, England, have invented a new and useful Apparatus for Utilizing an Expansive Force, of which the following is a specification.

My invention relates to improvements in means for utilizing an expansive force, such for example as the expansive force of an ignited combustible charge under pressure. My object is to provide an improved means whereby this expansive force may be utilized in causing the reciprocation of a body of liquid, the movement in one direction of said reciprocation being due to said expansive force, and utilizing the momentum of the liquid body in both directions whereby liquid is delivered to a greater head, or energy is stored, fresh liquid is entrained, the exhausted charge is expelled and a fresh expansible charge is entrained and compressed.

The invention is especially applicable to pumps or compressors.

The accompanying drawings illustrate, merely by way of example, suitable apparatus for effecting my invention.

Fig. 2 is a similar view showing a modified form of valve control.

Fig. 3 is a cross-section showing a modified form of water-valve.

Figs. 6 to 26 are diagrammatic views in vertical section, showing various modifications of apparatus suitable for effecting my invention.

Similar numerals refer to similar parts throughout the several views.

This application is a division of my application entitled Methods of raising or forcing liquids and apparatus therefor filed June 13, 1908, Serial No. 438,425.

The precise action of apparatus of this kind depends on the relative and absolute capacity, situation and length of the supply pipe, the delivery pipe, and the auxiliary suction pipe, when such is used, and it may be advantageous to place air chambers in one or more of these pipes.

Figure 1:
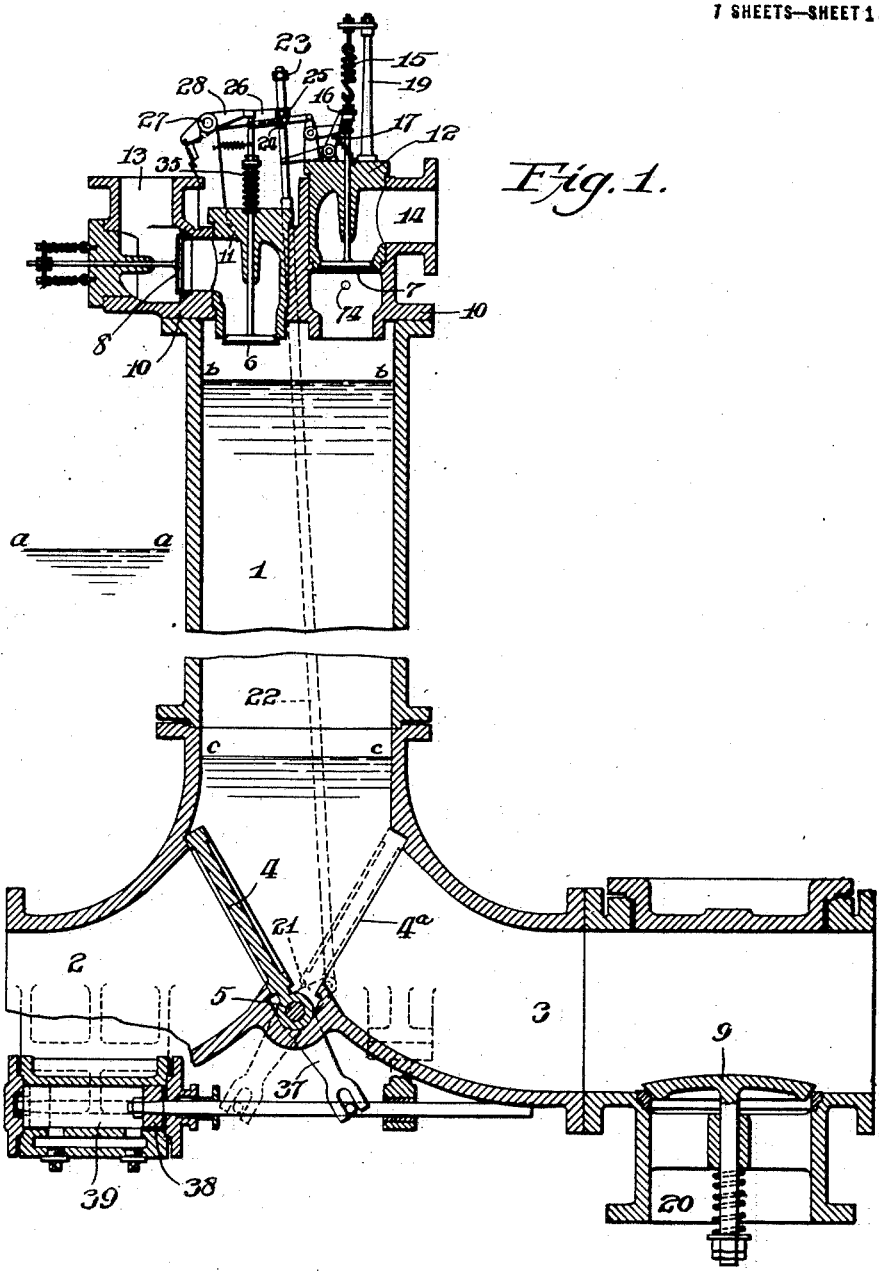
Figure 1 is a vertical section of a portion of my device showing the combustion and expansion chamber and valves connected therewith, a branch adapted to connect with a source of supply and another branch adapted to connect with a play pipe leading to a reservoir or other means for storing energy, not shown.

In Fig. 1, 1 is the combustion and expansion chamber, 2 is the supply pipe communicating with a tank the level of the liquid in which is, say, at $a$—$a$. 3 is the discharge pipe the length and dimensions of which must be such that the moving mass of liquid will acquire the momentum necessary for the effects to be produced. A valve 4 pivoted at 5 is adapted to close either the communication between chamber 1 and the supply pipe, as shown, or that between the chamber and the discharge pipe as indicated in dotted lines. At the top of the combustion chamber there are an exhaust valve 6 and a mixture inlet valve 7, the former being preferably in a plug 11 and the latter in a plug 12 in the casting 10. The discharge pipe is in communication through a non-return valve 9 with a pipe 20 connected with the aforesaid supply tank or with another supply of liquid which may be at a lower level than that tank.

Leaving for the moment the mechanism by which the valves 6 and 7 are operated, the cycle in such an apparatus is as follows:—

Assuming the position of the parts to be that shown and chamber 1 to contain liquid up to a level represented for instance by the line $b$—$b$, above which is combustible mixture suitably compressed, ignition occurs, such as by means of the sparking plug 74, and the liquid is driven along the discharge pipe to a place of higher pressure or higher level. When the products of combustion have expanded to a certain degree, say to the level $c$—$c$, the position of which will depend, among other factors, on the height of the surface of the liquid in the supply tank above the valve 4, the pressure in the chamber tending to keep the valve 4 closed, falls below that in the pipe 2 tending to open the valve, whereupon the latter swings over to the position $4^a$ shown in dotted lines.

Liquid now flows into the chamber from the supply tank expelling the products of combustion, through the valve 6 which has opened or been opened in any suitable manner, such as that presently to be described. The momentum acquired by this moving liquid causes it in the chamber to over-run the level in the supply tank, say a—a, and substantially at the moment when the liquid having attained its maximum level in the chamber commences to return the valve 7 is opened and valve 6 is closed. The liquid now returns, and in doing so draws in the fresh charge through valve 7, which then closes.

At the time when the valve 4 took up the position 4ª, the liquid in the discharge pipe had attained considerable velocity, and on account of the length of the pipe the kinetic energy stored in the moving column is considerable, so that the latter continues its motion after the valve 4 has come into position 4ª and draws liquid into the discharge pipe through valve 9.

Presently the column comes to rest, valve 9 closes automatically and under the action of the inwardly flowing column of liquid, valve 4 now swings over to its original position and the returning liquid enters the chamber and compresses the charge. The cycle then begins again.

The valve distribution is in this example as follows:—Rigidly connected with valve 4 is an arm 21 to which is pivoted one end of a rod 22. The other end of this rod, shown drawn to an enlarged scale in Fig. 4, extends through a sleeve 25 pivoted to an arm 26 of a short rocking shaft 27. This end of the rod carries two tappets 23, 24. When the valve 4 swings over as described above, rod 22 is pulled downward and at a predetermined period of its stroke tappet 23 depresses the lever 26 and therefore the arm 28 which is also keyed to shaft 27. The last named arm rests on a pawl 34 pivoted to the end of the stem of the exhaust valve 6 and normally in line with the axis thereof; thus the depression of the arm opens the valve. Meanwhile the tappet 24 has turned an arm 29 of a short rocking shaft which also carries a pawl 17; the latter is thus disengaged from the collar 16 on the stem of the inlet valve 7 which until now it has prevented from moving. The spring 15, however, attached at one end to the valve spindle and at the other end to a post 19, still keeps this valve shut. The products of combustion are now expelled as already described past valve 6 and a non-return valve 8 which is inserted in the exhaust pipe 13 to prevent the products from being sucked back again into the chamber during the return movement of the liquid in the chamber that now occurs. This return or suction stroke causes valve 7 to open and a combustible charge is drawn in through pipe 14. As valve 7 moves downward, pin 18 which is engaged with the forked arm 30 of crank 31 pivoted at 32, turns the crank and by means of slotted link 33 pulls the pawl 34 out of engagement with arm 28, thus enabling spring 35 to close valve 6. When the force of the suction no longer exceeds that of spring 15 valve 7 is closed again and in rising the pin 18 returns the crank 31 to its original position, bringing pawl 34 against the end of arm 28 ready to be pulled beneath this end by spring 36 as soon as valve 4 has lifted rod 22 by returning to its original position, shaft 27 and pawl 17 being then also returned to their original positions by their respective springs.

In order to time the motion of valve 4 and also to prevent it from striking a blow on its respective seats, I provide an additional arm 37 rigidly attached to it so that when the valve moves it operates a piston 38 in an oil dash pot 39 or other equivalent device. By an arrangement of suitable grooves and by-passes in the dash pot cylinder the motion of valve 4 may be completely controlled in any desired manner, thus for instance it may be made to pause before coming against either of its seats.

Although a single valve 4 affords the simplest construction, two ordinary non-return valves suitably linked together, one controlling the supply pipe and the other the discharge pipe, may be used as shown in Fig. 3.

When the head or pressure of the liquid in the supply tank is such that the liquid flowing into the chamber to expel the products would over-run the level of the exhaust valve, the oscillation necessary for the intake of a fresh charge may be obtained in a manner which will be explained with reference to Fig. 10. The supply tank 58 is here shown at a higher level than the top of the chamber 1, a a being the level of the liquid in the tank. Assuming that a compressed charge exists above the level b—b of the liquid in the chamber, this charge is ignited and the cycle is the same as that already described until the valve 4 swings over into the position 4ª consequent on the fall of pressure in the chamber. The exhaust valve 6 now opens by its own weight, assisted, it may be, by any pressure above the valve in excess of that in the chamber.

Liquid flowing from the supply tank rises in the combustion chamber and expels the products of combustion, but as the level of liquid in the supply tank is such that the liquid in the combustion chamber tends to rise above the level of the valve 6, this valve may be shut by the impact of the rising liquid, and the further motion of the liquid arrested by the cushioning of the exhaust products entrapped in the top of the combustion chamber above the level of the valve 6. This cushioning puts the entrapped products under pressure to an extent depending principally upon the velocity of flow when the valve 6 shuts, and the elastic cushion expanding, drives down the liquid in the combustion chamber so that after its level arrives at that of valve 6 its further motion draws in a fresh combustible charge past the inlet valve 7. The level of the liquid having reached its lowest point, some compression of the fresh charge may occur due to the further tendency of the liquid between the supply tank and the combustion chamber to oscillate, but the final compression is produced by an inwardly flowing column of liquid in the discharge pipe as already described.

Figure 5:
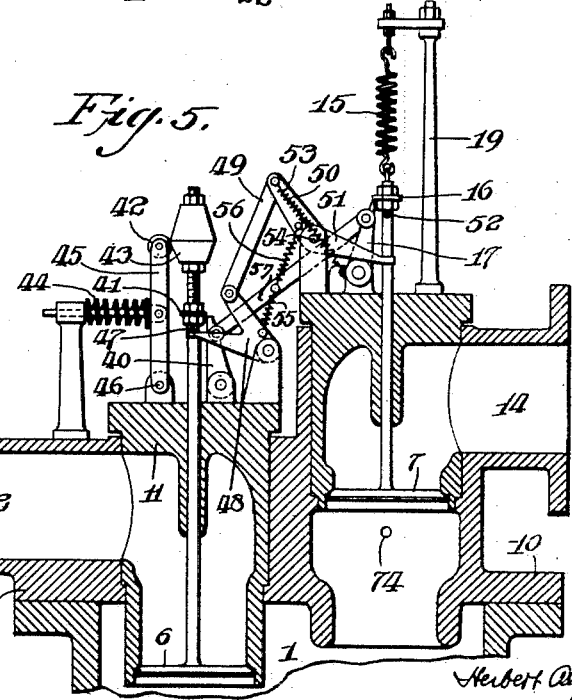
Fig. 5 is a similar view, of the valve controlling mechanism shown in Fig. 2.

A suitable valve gear for the cycle last described is shown in Fig. 2, and in Fig. 5 drawn to an enlarged scale. The exhaust valve 6 is normally held up by a pawl 40 engaging under a collar 41 fixed on the valve stem, but even when pawl 40 is disengaged, the valve 6 continues to be held up by a small roller 42 pressed against the inclined surface 43 of a suitably shaped part attached to the stem of the valve, by a spring 44 acting on the lever 45 pivoted at 46. The weight of the exhaust valve 6 with its stem and fittings may be so adjusted that the valve opens when the pressure inside the chamber is somewhat less than the outside pressure. This occurs at the end of the expansion stroke, at which time, as will presently be seen, pawl 40 is clear of collar 41. Valve 6 in opening has to press out the roller 42 and further, by means of pin 47 which engages crank 48 operates through link 49 crank 50, bringing the arm 51 of this crank against a pin 52 on the stem of valve 7. This position is rendered stable owing to the shifting of spring 53 to the other side of the pivot 54. The movement just described puts tension upon spring 55 and relieves the tension on spring 56 both of which are attached to the link 57 and to the respective cranks as shown. The effect is that pawl 40 and pawl 17 are both urged toward the left, but are prevented from moving in that direction by the collar 41 until the exhaust valve rises and permits pawl 40 to engage under the said collar, thus holding up the exhaust valve and releasing the inlet valve 7. After the exhaust valve has opened it remains open until shut by impact of the liquid upon it as already described. Immediately valve 6 comes on its seat the pawl 40 engages under the collar 41 and pawl 17 is moved clear of collar 16 on inlet valve 7. Thus, after the cushioning stroke has occurred the inlet valve 7 is free to open and admit a fresh combustible charge. This valve closes again under the action of spring 15. When the inlet valve opens, pin 52 on its stem, engaging with the end of crank 51, returns this crank to its first position where it is then held by the spring 53 which is now on the right of the pivot 54. Further, tension is put on spring 56 and relieved in spring 55 so that when the inlet valve shuts, pawl 17 again engages under the collar 16 and pawl 40 is moved clear of the collar 41 on the exhaust valve. In this position the cycle is ready to be re-started.

In Fig. 3 an alternative arrangement for the valve 4 is shown. Instead of a pivoted valve with two faces, there are two mushroom valves rigidly connected so as to form in reality one valve with two seats. It performs the same functions as the pivoted valve. However constructed, valve 4 may be controlled as already stated. Thus, for instance, in the cycle last considered, the valve 4 may be made to move slowly from the position in which it closes communication between the supply pipe and the combustion chamber and thus permits the pressure in the combustion chamber to reach atmospheric pressure or thereabouts in spite of the head of water in the supply tank tending to open wide the valve 4 before this pressure is arrived at.

The precise action of the apparatus may be varied by simply altering the arrangement of the connections between the combustion chamber and the liquid supply and delivery pipes respectively, and the arrangement of the auxiliary suction pipe and its connections with the supply pipe, if there be such connections, and the delivery pipe.

As an illustration of this, Fig. 6 shows in full lines a short connection 2—2, between the supply tank 58 and the combustion chamber with a separate connection of the tank with the auxiliary suction pipe 20, this connection being fitted with a cock 59 and a non-return valve 9. The drawing further shows the discharge pipe arranged with a nozzle 60 in an annular space 61 so that the liquid issuing from the nozzle may have an injector action upon the surrounding liquid and cause liquid to flow through the auxiliary suction pipe as if it were flowing under a greater head than the actual head.

In Fig. 7 is shown a long supply pipe connecting the supply tank with the combustion chamber so as to give greater inertia to the column of liquid moving in this pipe, the effect of which is to lengthen the time of oscillation of the liquid and so prolong the period of exhaust and admission.

The auxiliary suction pipe may be connected with the long supply pipe instead of being connected directly with the supply tank.

For modifying the required oscillation by and inductive action of the liquid set in motion by the combustion I provide an arrangement such as is shown in Fig. 7. Here the inlet 20ᵃ of the auxiliary suction pipe is so placed in relation to the supply pipe that liquid flowing in the former will have an inductive action on liquid flowing in the latter.

Instead of the cock shown in the auxiliary suction pipe of Fig. 6 I provide a throttle valve 62 or its equivalent, as shown in Fig. 9, and this valve is worked from the pivoted valve 4 by means of arms 63, 63, and connecting link 64. In this case, if the auxiliary suction has a short connection to the supply tank and the main pipe has a long connection to the supply tank, the liquid in the latter can be started in motion as soon as the valve 4 begins to change its position and before a free passage for the liquid is opened through the auxiliary suction pipe. The effect is increased if the movement of valve 4 is retarded so as to give time for some of the liquid in the supply pipe to pass over the valve 4 and into the discharge pipe before valve 62 opens.

In Fig. 8 is shown, in diagrammatic form, some of the possible arrangements of the supply tanks in relation to the apparatus itself. Thus the auxiliary supply pipe may be connected either to a separate low level tank below the level of the discharge pipe 3, or to a separate tank above the level of the discharge pipe.

It is sometimes preferable to insure that the combustible charge taken in shall be a definite one, in which case the apparatus may be provided with a measuring device introduced either into the supply pipe or into the discharge pipe. Fig. 11 illustrates one of several forms which such a device may take. In the supply pipe 2 is a piston valve 65 attached to a rod 66 and capable of moving into the dotted position 65ª in which liquid can flow past the piston into the combustion chamber to expel the products of combustion. As soon, however, as this liquid begins to return toward the supply tank and to draw in a fresh combustible charge, the piston enters into the cylindrical portion of the supply pipe in which it forms a freely moving piston, and thus, by its limited motion in passing from the position 65ª to the position 65 measures into the cylinder a more or less definite quantity of combustible charge. There may be in the discharge pipe a throttle valve or the like 67 actuated by arm 68 attached by link 69 to an arm 69ª pivoted to a projection on the wall of the combustion chamber. When explosion occurs the throttle valve is open and the piston valve is on its seating closing the connection with the supply pipe. When expansion has proceeded to the point at which the pressure below the piston valve exceeds that above it, the valve rises and, engaging the arm 69ª, proceeds by its further motion to shut the throttle valve. The throttle valve remains shut and so prevents any liquid returning along the discharge pipe into the combustion chamber until the piston valve returning to its seat causes a tappet 70 on the piston rod to engage arm 69ª and so open the throttle valve 67. The liquid column in the discharge pipe is now free to return and compress the combustible charge which has been drawn in.

It is not essential that the fresh charge or the whole thereof or both constituents thereof, should be drawn in at the top of the combustion chamber; when desirable there may be substituted for the inlet valve 7, or this valve may be supplimented by, another valve situated in the delivery pipe as shown at 71 in Fig. 12. When valve 4 swings into position 4ª as already described, the liquid in pipe 3 is moving with considerable velocity and draws in a charge through the valve 71. The degree of suction produced in the regions of this valve depends, among other things, upon the degree of freedom with which liquid can be drawn through the auxiliary suction pipe 20 past the valve 9 to follow the moving liquid in the discharge pipe. Consequently the degree of suction at valve 71 may be adjusted by more or less closing cock 59 in pipe 20. In order to have a definite amount of combustible mixture, or of a constituent thereof, at each cycle, there may be an attachment consisting mainly of two valves 72 and 73 controlling respectively a pipe 75 which admits the combustible mixture or a constituent thereof, and a pipe 76 dipping into liquid at say the level $e\ e$. The action of this part of the apparatus is as follows:—When valve 4 comes into position 4ª, valve 71 opens, and the combustible charge, or a constituent thereof, is drawn in. But valve 71 is connected with valve 72 by the link 77 so that when valve 71 opens, valve 72 is closed. The suction draws liquid up the pipe 76 from the level $e\ e$ to the level $f\ f$ thus displacing combustible charge by liquid until the liquid shuts valve 73. As the volume of liquid between the two levels is a definite amount, this arrangement permits a given volume of combustible mixture, or a constituent thereof, to be drawn into the discharge pipe. It will be observed that, by altering the level of the liquid into which the pipe dips, the amount of combustible mixture drawn in through pipe 75 past valve 72 when the valve 71 is shut and the liquid in pipe 76 tends to return to its normal level, can be varied. This device, which in effect consists of a liquid piston moving between difinite limits, may also be applied to the inlet valve 7.

If the whole of the constituents of the combustible mixture are drawn in through valve 71 it is desirable that the height of the liquid in the main supply tank should be such that, when the liquid flows from the supply pipe into the combustion chamber, it should just rise to the height required to drive out the products of combustion, also the liquid should not be allowed to return. In this case a non-return valve 78 is fitted in the supply pipe so that when the liquid rises in the combustion chamber by its momentum above the level of the liquid in the supply tank it may be maintained at its level and no reverse flow may occur. As the exhaust valve may conveniently open when valve 4 moves to position 4ª and close when valve 4 has returned, the exhaust valve may be directly operated by valve 4 through arm 79, rod 80, and lever 81. The cycle of operations for the apparatus as a whole need not be repeated, but it should be stated that after the outwardly moving column of liquid in the discharge pipe has come to rest the combustible charge of constituent which has been drawn into the sloping portion of the discharge pipe is swept by the inwardly moving column of liquid into the combustion chamber, and therein compressed. When only one constituent of the combustible mixture or a portion of the combustible mixture is drawn in at valve 71 the non-return valve 78 may be dispensed with, and the other constituent or the other portion of the combustible mixture may be drawn in in the usual manner through valve 7.

Figure 4:
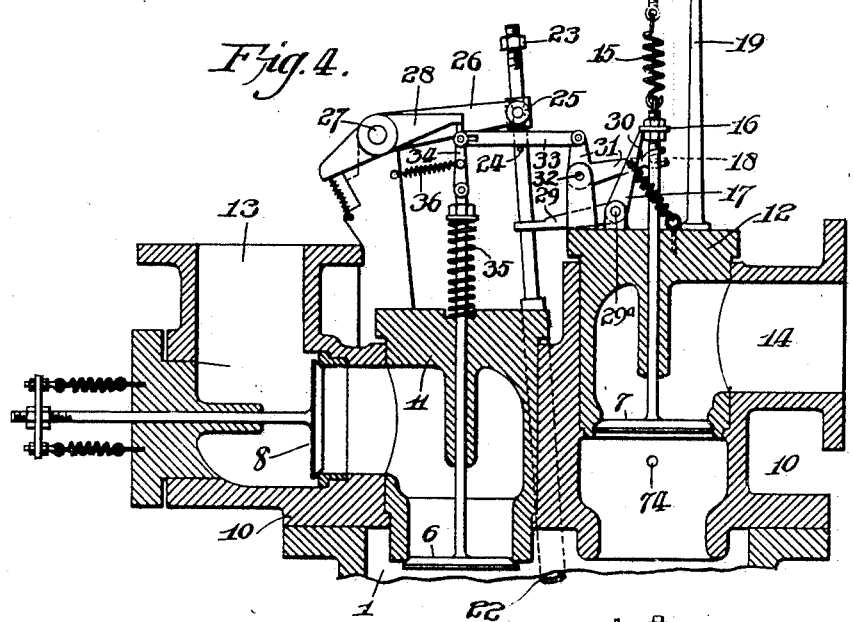
Fig. 4 is a vertical sectional view on an enlarged scale, of the valve controlling mechanism shown in Fig. 1.

A somewhat modified working of the apparatus is obtained if there be no valve closing the communication between the chamber 1 and the discharge pipe. Such a modification is shown in Fig. 13, in which the motion of valve 4 is limited by means of the stop 82. In this case the auxiliary suction pipe may be dispensed with because when valve 4 opens the communication with the supply pipe in the usual manner, toward the end of the expansion stroke liquid can flow from the supply pipe 2 over the top of valve 4 and so directly into the discharge pipe 3, as well as into the combustion chamber in which the liquid rises to expel the burnt products and falls again to draw in a fresh charge in the manner already described, and when this has happened the returning column of liquid in the discharge pipe closes valve 4 and compresses the charge. If valve 4 is controlled by a dash pot or equivalent arrangement, so that it does not close immediately on the return of the column of liquid in the discharge pipe, some of this liquid may flow in the reverse direction over the top of the valve and into the supply pipe, thus allowing the velocity of the returning column of liquid to increase beyond that which it would otherwise have attained when valve 4 shuts. The additional kinetic energy stored in the moving column of liquid will then give rise to a higher compression pressure of the combustible charge. This method of increasing the compression applies in general and is not confined to this particular case. In this, as in other cases, expansion may be continued beyond atmospheric pressure without loss of energy, because, if the exhaust and inlet valves are kept closed long enough, work will be done by the external atmosphere in forcing liquid into the combustion chamber until atmospheric pressure is again attained.

Where the exhaust and inlet valves are sucked open, and in opening these valves have to move valve gear requiring the expenditure of a small amount of power, the valves themselves may, for a portion of their travel, act as pistons in a prolongation of their valve seats, as shown in Figs. 4 and 5.

Another simple method of introducing the combustible charge in this case explained in connection with the form of apparatus shown in Fig. 13, may now be described in connection with Fig. 24. Between the liquid in the supply tank 58 and the supply pipe 2 is placed a bell 168 or other chamber with means of restricting the flow of liquid between the tank and the supply pipe; such, for instance, as a number of holes 169 perforated in the bell, the amount of opening of which can be regulated by a perforated band 170, the holes in which can be made to register more or less with the holes in the bell. The bell has at its upper part one or more inlets 171, 172 for the introduction of the constituents of the combustible charge. When valve 4 is in that position that it closes communication between the combustion chamber and the supply pipe, the liquid in the tank tends to level itself and rise to the same level in the bell through the holes. Toward the end of the expansion stroke, when valve 4 takes up its dotted position, liquid from the bell enters the combustion chamber and expels products of combustion. If the exhaust valve is shut, and the inlet valve is not allowed to open, or only opens under a sufficiently stiff spring, the liquid flowing in the discharge pipe will draw after it liquid from the supply pipe in the manner already described. Should this demand for liquid be greater than the total supply through the holes in the bell, air or combustible, or both, will be drawn through the pipes 171, 172, into the supply pipe and combustion chamber, until the liquid in the discharge pipe having come to rest, a column of liquid starts to flow inwardly, closes valve 4, and compresses the combustible charge in the combustion chamber. While this valve is closed, so much of the combustible charge as was in the supply pipe and lower portion of the bell is replaced by liquid from the supply tank flowing through the holes in the bell, and when the liquid level in the bell has risen sufficiently, everything is ready for starting a fresh cycle.

The application of air vessels will now be explained with reference to Figs. 14, 16 and 17:

If the working pressures may for the moment be regarded as the same for each cycle, then the periodicity of the cycle depends upon the length and mass of the columns of liquid which are acted upon by the said pressures, or, in other words, by the dimensions of the pipes in which these columns move. It would be inconvenient to alter the dimensions of the pipes for the purpose of varying the periodicity of the cycle but the desired effect may be obtained by the use of air vessels, intensifiers or accumulators communicating with the said pipes. It will be sufficient to explain the effect of introducing air vessels, intensifiers, or accumulators into the discharge pipe or conduit as shown in Fig. 14. These air vessels may be controlled by cocks, and when these cocks are shut the full length of the discharge pipe is effective as regards the resulting periodicity. In the cock 83 on air vessel 84 is opened, liquid forced from the combustion chamber during the working stroke causes liquid from the discharge pipe to enter the air vessel, but on the return stroke, when the liquid flows back toward the combustion or pump chamber to compress the combustible charge, liquid leaves the air vessel again. The result is to make the effective length of the discharge pipe shorter, and if the air vessel, intensifier, or accumulator 84 might be considered indefinitely large the effective length of the discharge pipe may be considered as that between the combustion chamber and the air vessel, intensifier, or accumulator, and the flow of liquid in the discharge pipe beyond the air vessel would be more nearly continuous. The effect of the air vessel depends on its capacity, and as it would involve a loss of energy to throttle the liquid inlet by means of the cock 83 it is better to add an additional air vessel 85 the communication with which can be controlled by the cock 86. It will be noticed that when air vessels are used in the manner described they accumulate or store up energy in an elastic cushion during the working stroke and give out energy again during the compression stroke.

When an air vessel 87 is used in the discharge pipe, with the object of producing a continuous flow, such air vessel may be fitted with a non-return inlet valve, as shown in Fig. 16, and in this case a second air vessel may be used to store the energy for compression of the combustible charge by the returning mass of liquid in the manner already described. Such second air vessel is shown at 88 as fitted with a valve 89 attached to a float, so that when the liquid has risen to a given height the float closes the valve. In operation, the column of liquid flowing outward from the combustion chamber flows first into air vessel 88 until the level of liquid therein attains a height at which the float closes the valve and this should be so adjusted that the available energy then stored in the elastic cushion represents that required for giving the compression stroke. When valve 89 closes, the column of liquid in the discharge pipe has a considerable velocity and as its motion cannot be instantly arrested by the closing of valve 89 the flow continues, and valve 90 on air vessel 87 is forced open and liquid flows into air vessel 87 until the energy of motion is expended. This arrangement of air vessels is preferred in the case where I use the liquid to drive a Pelton wheel as before mentioned, because it is desirable to use a higher pressure in that case than is required for other impulse or reaction turbines, and the arrangement permits of much higher pressures being attained, as the pressure in air vessel 87 may exceed any of the working pressures in the combustion chamber. The valve on air vessel 88 may be controlled so as to shut when the elastic cushion in the air vessel has a predetermined pressure, and for this purpose any suitable means may be used to close the valve when the pressure of the elastic cushion overcomes an opposing pressure and so gives motion to the valve. In the case where even higher liquid pressures are required and to still obtain complete expansion of the products in the combustion chamber, there may be another valve 91 at the end of the discharge pipe which is kept normally open by a spring and is closed when the liquid flowing past it reaches a given velocity on the principle of the well known hydraulic ram. In this case liquid flowing in the discharge pipe first runs to waste through valve 91 while the velocity of flow in the discharge pipe is increasing, then valve 91 suddenly shuts, causing the liquid to flow first into air vessel 88 and then into air vessel 87 in the manner already explained. Fig. 17 shows a similar arrangement to that last described, but without any valve or float in air vessel 88. Consequently the elastic cushion pressure in the air vessel 88 must become equal to the pressure in the air vessel 87 before valve 90 opens, and in this case, owing to the higher pressure, the quantity of elastic fluid in air vessel 88, required to store the energy for compressing the combustible charge will be less than if a larger volume of elastic fluid is used and the pressure kept lower as in the arrangement of Fig. 16.

As already stated, the delivery and suction pipes may be duplicated and so arranged that the forces developed tend to balance each other.

A duplication of the discharge pipe may also serve to make the apparatus operate more quickly. Thus, the discharge pipe 3 may branch into two pipes 3ᵃ and 3ᵇ. If each of these pipes is of the same length and diameter as the one discharge pipe which they replace, the time of the cycle will be shortened. If the branch 3ᵃ is longer than the branch 3ᵇ and non-return valves 92 and 93 are introduced as shown, so that the branch 3ᵃ becomes the passage for the outwardly flowing liquid and 3ᵇ the passage for the return flow, then a more continuous flow can be obtained in the branch 3ᵃ, and such an arrangement is shown in Fig. 15. When valve 4 moves to its position 4ᵃ both valves 9 and 92 will open to supply liquid to follow the moving liquid in the discharge pipe 3ᵃ, but by proper adjustment liquid will be mostly drawn through the short connection at 20 because of the greater inertia of the liquid in the return pipe 3ᵇ which has to be started from rest. After valve 9 shuts, liquid from the return pipe will flow into the combustion chamber, giving the compression stroke, but some liquid from the return pipe may also continue to follow the liquid moving in the discharge pipe, so that the direction of flow in the discharge pipe may, under some circumstances, never be reversed. When the pressure rises on combustion, valve 92 shuts. Pipes 3ᵃ and 3ᵇ may lead to separate reservoirs at different levels.

Where it is not convenient to place the supply tank at such a level that liquid may flow by gravity into the combustion chamber to displace the burnt products, the general method may be modified as already stated, by raising the liquid required for this purpose by means of a portion of the energy of the combustion at each cycle. Fig. 18 shows an air vessel 94 connected by pipe 95 with the delivery pipe 3, so that when the liquid is under pressure during the working stroke a portion of the liquid may flow past valve 96 into the air vessel 94 and so compress the elastic cushion and store energy. The energy thus stored may be released when valve 4 changes its position, and for this purpose the valve 4 may be connected by an arm 97, a link 98, and another arm 99 with a throttle valve 100 or its equivalent. When the throttle valve 100 is opened the elastic cushion in the air vessel 94 expands and drives liquid through pipe 101 in such manner that it has the action of an injector and raises water from the supply tank into the combustion chamber. The amount of the charge drawn in, being determined by the quantity of liquid which flows back to the supply tank, may be regulated by means of a non-return valve 102 and a control by-pass 103.

Another means of lifting liquid from a low level supply tank is shown in Fig. 19, the chief difference from the last case being that the portion of the energy at each cycle which is utilized for raising the liquid is directed to act upon a piston 104 in a cylinder 105 and to compress an elastic cushion in the top portion of this cylinder. Thus, either high pressure liquid or high pressure products of combustion may be conducted to the lower part 106 of the cylinder to raise the piston 104, the inlet valve 107 and the outlet valve 108 serving to allow entrance and discharge of the operating medium. Piston 104 is attached by rod 109 to piston 110 working in cylinder 111, and on the upward stroke the liquid is drawn into the cylinder through valve 112 and on the down stroke is discharged through valve 113, the discharged liquid being arranged to have an injector action and so raise liquid from the low level supply tank in the manner previously described. The release of the elastic cushion may be brought about by the action of valve 4 through arm 97, rod 98 and crank 114 as shown.

In the foregoing description the combustible charge has been drawn into the apparatus. The charge may equally well be introduced under pressure and for this purpose it may be pumped in or otherwise forced in by any known device preferably after the products of combustion have been expelled. It is economical, however, to apply a portion of the energy of the combustion at each cycle to put the combustible mixture or a constituent thereof under sufficient pressure to enable it to enter the chamber at the desired moment.

Thus in Fig. 20 a separate air vessel 115 is connected with the combustion chamber 1 or to the discharge pipe at such level that the connection is always below the level of the liquid. A portion of the energy of combustion at each cycle compresses air in this vessel and stores it in a carbureter 116 so that when the stored air is released by the opening of the throttle valve 120 by the downward movement of the inlet valve 7 operating, through crank 117, link 118, and arm 119, the compressed air flowing through pipe 121 may draw with it petrol or other combustible liquid through the small pipe 122 and inject it in an atomized condition, along with the air supply, through pipe 121. An air inlet valve 123 is fitted to the air vessel 115, and a non-return valve 124. It should be observed that pressures exceeding the explosion pressure may be obtained in the air vessel 115 owing to the momentum of the intervening column of liquid and the relatively smaller size of the air vessel 115 as compared with the combustion chamber 1.

Another device for the same purpose is shown in Fig. 22. A number of pistons, 127, 128, 129, in this case limited to three, are linked together by a rod 130. One of the pistons, 128, is adapted to be acted upon either by the fluid which is subject to the pressure of the ignited combustible gases or directly by the ignited gases themselves, and the said piston is preferably placed in a branch or limb 138 of the discharge pipe or of the combustion chamber. In the present case the piston is shown as acted upon by the fluid in the discharge pipe. The piston 127 works in a cylinder 131 in the upper part of which is fitted an inlet valve 141 for combustible charge and an outlet valve 143 controlling a pipe 132 which leads to the combustion chamber. In the lower part 133 of the cylinder 131 is an elastic fluid confined therein by the valve 146 and serving to form an elastic cushion to store energy. It is necessary that this stored energy should be retained until the moment it is required to inject combustible charge into the combustion chamber, and for this purpose the piston 129 may work in a dash pot 135 fitted with a by-pass 136 controlled by an equilibrium or other valve 137. The branch 138 in which piston 128 works is prolonged and turned upward with a closed end so as to form the air vessel 139. The piston 128 will then work with liquid on both sides, and the air vessel 139 will serve to store energy in the same manner as the elastic cushion in the lower portion 133 of cylinder 131. When combustion occurs in chamber 1 the piston 128 makes a downward stroke, which is limited by the pressure of the elastic cushion, and is locked in position by the oil or other fluid in the dash pot 135 which passes freely through valves 140 from the bottom to the top side of the piston 129 during the downward stroke, but is unable to return. During the said downward stroke combustible charge, or a constituent thereof, is drawn in through the valve 141 which may close under the action of a spring. When valve 4, having changed its position, returns to its first position and so closes communication between the supply pipe and the combustion chamber, it opens the by-pass equilibrium valve 137 by means of arm 142, rod 142ˣ, catch 144ᵃ, and crank 144, thus allowing the oil in the dash pot to return from the top of the dash pot to the bottom, and thus to release the energy of the elastic cushion in 133, and of the air vessel 139. The linked pistons then make an upward stroke, and the combustible charge drawn into the top part of cylinder 131, or a portion thereof, is forced past valve 143 and valve 7 into the combustion chamber. When this occurs there may, if desired, already be in the top portion of the combustion chamber a quantity of air or other combustible constituent previously drawn in by an oscillation in the chamber of the kind already described. For a given pressure of combustion the quantity of combustible charge drawn into the cylinder 131 will depend on the original volume and pressure of the elastic cushioning medium contained in the portion 133 of the cylinder if air vessel 139 is not used, consequently the length of stroke may be altered by varying the effective volume. For the latter purpose an additional air vessel 145 communicating with the lower portion 133 of cylinder 131 and controlled by a cock 134 may be used. Thus when this cock is open, the effective quantity of elastic medium is that contained both in the lower portion 133 of cylinder 131 and in the air vessel 145. By varying the amount of opening of cock 134 the quantity of charge drawn in, and subsequently forced into the combustion chamber, can be regulated. Again, by varying the relative diameters of the pistons 127 and 128 the pressure at which the combustible charge is forced into the combustion chamber may be varied.

When it is desirable that the liquid in the combustion chamber which comes into contact with the burnt gases, and may be contaminated thereby, should not form part of the liquid which is delivered at the end of the discharge pipe, means may be provided to isolate the liquid in the combustion chamber from the liquid in the discharge pipe such as a suitable diaphragm or an equivalent device. Such an arrangement is shown in Figs. 16 and 25 where the two extreme positions of the diaphragm are shown at 174, 175, the diaphragm being clamped in a suitable enlargement of the discharge pipe 3 as shown. The volume inclosed between the two extreme positions of the diaphragm must be sufficient to accommodate the amount of liquid which leaves the combustion chamber during the combustion and expansion stroke, and valve 4 must not be allowed to close communication between the supply pipe 2 and the combustion chamber 1 on the return stroke of the liquid in the discharge pipe until that quantity of liquid or thereabout, which entered the combustion chamber from the supply pipe, has been allowed to return thereto. To accomplish this end there are fitted in the diaphragm chamber 176 two buffers 177 and 178 working on spindles 179 and 180 which pass through glands and are connected outside the chamber to arms 181 and 182. These arms are connected by rods 183 and 184 to a bell crank 185 and again through link 186 to another arm 187 so as to operate the by-pass valves 188 and 189 in the dash pot 39 which controls the motion of valve 4. If on the working stroke so much liquid passes from the combustion chamber into the diaphragm chamber as would tend to force the diaphragm too far to the right, buffer 178 is turned about spindle 180 and by-pass valve 188 is opened to a greater extent, and the other by-pass valve 189 is shut to a greater extent. Thus the dash-pot piston 38 has a less resistance in moving from the position shown by full lines to the position shown by dotted lines, and a greater resistance in passing back to the former position. Consequently valve 4 moves more quickly from the full line position to the dotted line position 4ª, and more slowly from the dotted line position to the full line position, and more liquid is allowed to return from the combustion chamber into the supply pipe before valve 4 closes. On the next stroke, therefore, there will be less liquid between the full line position of valve 4 and the diaphragm, so the diaphragm will not be distended so far to the right. On the other hand, if the diaphragm tends to be distended too much to the left the action upon the by-pass valves 188, 189 is the opposite to that last described, as they are then turned by the motion of buffer 177 in the opposite direction, resulting in a greater resistance to the movement of valve 4 from the full line position to the dotted line position, and a less resistance to its motion in the opposite direction. Consequently valve 4 shuts in its full line position earlier than before, and more liquid is retained between the full line position of valve 4 and the diaphragm, so that on the next working stroke the diaphragm moves rather farther to the right. It will be seen that by the automatic arrangement the quantity of liquid which enters and leaves the combustion chamber remains practically unaltered and is entirely separated from the liquid in the discharge pipe or the liquid which enters past the auxiliary supply valve 9.

Instead of using a diaphragm, as in the case last mentioned, the liquid which enters and leaves the combustion chamber may be isolated from the liquid which flows in and is delivered from the discharge pipe by means of a liquid metallic piston, for example a U pipe containing liquid of a greater specific gravity than the working liquid. Fig. 26 shows such an arrangement where the discharge pipe 3 is bent into a vertical U shape and contains a dense fluid such as mercury, in the bottom of the U, as shown at $n\ n$. On the working stroke, when liquid is propelled along the discharge pipe, the dense liquid is depressed in limb 190 and elevated in limb 191, and when the liquid returns in the discharge pipe the dense liquid is depressed in limb 191 and elevated in limb 190. In order to prevent the dense liquid from being driven too far toward the discharge pipe or combustion chamber respectively, floats 192, 193, of such weight as to be acted upon only by the dense fluid when it rises to their level, may be placed in the two limbs of the U pipe. The lifting of either of these floats operates the by-pass valves 188, 189, and so controls the motion of valve 4 in the same manner as the buffers in the last described apparatus. In other words, the dense liquid takes the place of the diaphragm, and the floats take the place of the buffers.

So far, only one connection has been shown for conveying liquid to or from the combustion chamber 1 and the supply tank, although the multiplication of connections has been mentioned. It is obvious that the action of the apparatus is not materially altered by such multiplication of pipes, and that the pipes can be introduced at any suitable level in the combustion chamber. In Fig. 21 is shown an additional connection 125 to the combustion chamber 1 and fitted with a valve 126. When such additional pipe is introduced a little below the level corresponding with the maximum charge column and when the valve 126 is held open by a spring, this valve may shut by the action of the velocity of the liquid which flows past it when the return flow occurs from the discharge pipe to compress the charge. It has previously been described how the movement of valve 4 may be controlled to increase the compression pressure, and when valve 126 is used for the same purpose it has the additional advantage of lessening the shock on shutting.

The special ignition hereinbefore mentioned is shown in Fig. 23, but the chamber containing the diaphragm which merely serves to separate liquid entering and leaving the combustion chamber from the liquid which must be kept clean and enters and leaves the ignition apparatus, is not shown. A closed vessel 147 containing an elastic cushion in the upper part thereof and a body of liquid in the lower part thereof, is connected by a pipe 148 with the diaphragm chamber and is thus under the influence of the liquid in the combustion chamber. While the liquid in the latter is subject to an increasing pressure, liquid will be forced through 148 past the valve 149 into the vessel 147 and will thus compress the elastic medium in the top portion of the vessel. The valve 149 can slide on rod 150 and is held in position between two springs 151, 152 which press against two stops 153, 154 and so tend to hold the valve centrally between them. Connected with the valve rod 150 is a forked extension 155 which is spanned by a cross bar 156 attached to a float 157 placed in a cup 158 containing mercury. The mercury floats the moving parts so that they move with little friction. Attached to the float 157 is the conductor 159 carrying the small metal brush 160 which rubs either against the insulated parts 161, 162, or makes contact with the conductor 163. The latter is connected with a metallic wire 164 sealed into the closed end of a U tube 165 containing mercury. Into the open end of the U tube 165 another wire 166 projects. The action of the apparatus is as follows:—

While liquid is flowing into the vessel 147, due to an increase of pressure in the combustion chamber, the rod 150, float 157 and brush 160 are all lifted by the inflowing liquid, which has to escape between the internal flange 167 and the valve 149. In this position the brush 160 does not make contact with the conductor 163. When the compression stroke in the combustion chamber is completed and the maximum compression pressure is attained, there is a tendency for the pressure to fall again. The compressed elastic medium in the top of vessel 147 immediately tries to expand and thus force back liquid from vessel 147 into the diaphragm chamber. A very small reversal of flow past the valve 149 causes the valve to take up the dotted position by passing through the constricted portion or hole caused by the flange 167. This downward movement of the valve draws down the float in the mercury cup and causes brush 160 to come in contact with the conductor 163, thus closing the ignition circuit and causing a spark or sparks. In order that no spark shall be produced when the compression stroke is commenced or after combustion is complete and expansion begins, the mecury is filled into the U tube 165 so that at a low pressure, say that of the atmosphere, the levels in the two limbs of the U tube are as shown at $g\ g$, $h\ h$. In this position the wire 164 does not dip into the mecury and the circuit cannot be completed. When the pressure increases the air or other elastic medium contained in the sealed end of the U tube 165, above the mercury level, is compressed, and at any levels between $i\ i$ and $k\ k$ both wires are in contact with the mercury in the U tube. This range of levels corresponds with the range of compression pressures, and at any pressure in this range the brush 160 coming in contact with conductor 163 can complete the ignition circuit and cause a spark. At higher pressures indicated by mercury levels above $i\ i$ the mercury in the U tube is in contact with wire 164 but not with wire 166 and so the circuit cannot be completed. It will be observed that the pressure inside and outside the glass U tube is always approximately the same and the tube is therefore not subject to rupture.

The possible methods of control of the various forms of apparatus described in this specification are very numerous. Some have already been referred to, and others may be mentioned. For instance,—the height of the liquid in the suction tank may be varied, and if the liquid raised or forced is to be returned to the pump for use over again, there may be two supply tanks, one overflowing into the other, and so arranged that the height of liquid in that tank which connects with the suction pipe may be varied. The known methods for varying the work done per stroke in ordinary gas engines may be applied to the present pump. Thus, the quantity of combustible mixture drawn into the combustion chamber may be varied by throttling the mixture, or the quantity of gas or petrol or other combustible constituent may alone be varied. Then again, the period of ignition may be made later or earlier by a simple alteration to the ignition apparatus so as to produce effects similar to those obtained by such means in ordinary gas engines. The operation of the pump may be considerably affected by the character of the control given to the working valves.

The combustible charge for starting may be pumped in by hand against the static head or pressure of the liquid in the delivery pipe and combustion chamber, and as this pressure is less than the normal compression pressure the charge may be made rather larger than usual. Such charge can be ignited by a short circuiting switch, which is at once thrown out of use again, and the rest of the operation is automatic.

It is possible that, in starting the apparatus to work, the correct proportion between the constituents of the combustible mixture may not be readily obtained and the charge may consequently be incapable of ignition, also changes in the composition may occur during running, with a like result. In order to cause the apparatus to continue working in spite of a misfire, the liquid inlet valve such as valve 9 in Fig. 2 may be normally held off its seat by a spring, such as is shown for controlling valve 91 of Fig. 16 or the like in such manner that during the inward flow of a column of liquid which returns toward the combustion chamber to compress the combustible charge liquid is allowed to flow to waste through the said valve until the valve is closed under the action of the velocity of the returning column. The column thus gains a higher velocity, than if it only returned to compress the charge, and if the said charge is not ignited it will, after compression to a higher pressure than usual, expand again much as if there had been a feeble explosion. Valve 4 will change to the position 4ª and the unburnt charge will be exhausted and a new charge drawn in in the usual manner, the cycle being repeated at the expense of the energy of the high level or presure reservoir which supplied the liquid for the returning column. As soon as a charge ignites the tension on the spring of valve 9 which held it from its seat may, if desired, be reloaded and the valve thereafter allowed to act in the normal manner as already described, otherwise the apparatus may be allowed to continue working so that at any time a mis-fire will not stop the apparatus. A similar result may be obtained by so regulating the dash pot on valve 4 that when it is returning from the position 4ᵃ to the position shown in full lines it is arrested in the position which allows the discharge and the supply pipe to remain in communication long enough for some of the liquid which flows inwardly toward the combustion chamber to pass over the top of valve 4 into the supply pipe, thus gaining an increased velocity so that the liquid which rises in the combustion chamber to compress the fresh charge may compress it under such conditions that it expands again to a pressure low enough to bring about the movement of valve 4 and of the exhaust valve as in the ordinary working cycle so that the unburnt charge is swept out and a new charge introduced.

It has already been mentioned that the reservoir into which the liquid is raised or forced may be a closed reservoir, so that the upper portion thereof operates as an air vessel. It is obvious that the same idea can be applied to the supply tank, and throughout the specification the words "head" and "pressure" are generally interchangeable.

Air vessels may be used wherever required to prevent shock.

What I claim is:—

1. The combination of a power chamber for an elastic prime medium having pressure and expansive force, a play pipe for the reciprocation of a liquid column, means for communicating an actuating force from the power chamber to the liquid column, and means for restraining said actuating force after the liquid column has been set in motion.

2. The combination of a power chamber for an elastic prime medium having pressure and expansive force, a play pipe for the reciprocation of a liquid column, means comprising a liquid piston for communicating an actuating force from the power chamber to the liquid column, and means for restraining said actuating force after the liquid column has been set in motion.

3. The combination of a power chamber for an elastic prime medium having pressure and expansive force, a play pipe for the reciprocation of a liquid column, means comprising a piston in the power chamber for communicating an actuating force from the power chamber to the liquid column, and means for restraining said actuating force after the liquid column has been set in motion.

4. The combination of a power chamber for an elastic prime medium having pressure and expansive force, a play pipe for the reciprocation of a liquid column, means comprising a diaphragm piston for communicating an actuating force from the power chamber to the liquid column, and means for restraining said actuating force after the liquid column has been set in motion.

5. The combination of a power chamber for an elastic prime medium having pressure and expansive force, a play pipe for the reciprocation of a liquid column, an actuator for communicating an actuating force from the power chamber to the liquid column, and means for restraining said actuating force after the liquid column has been set in motion.

6. The combination of a power chamber for an elastic prime medium having pressure and expansive force, a play pipe for the reciprocation of a liquid column, an actuator for communicating an actuating force from the power chamber to the liquid column, said actuator having a limited movement whereby, after the actuator comes to rest, the continued movement of the liquid column, due to its momentum, will cause the intake of fresh liquid.

7. The combination of a power chamber for an elastic prime medium having pressure and expansive force, a play pipe for the reciprocation of a liquid column, a piston in the power chamber, an actuator in operative relationship with the piston for actuating the liquid column.

8. The combination of a power chamber for an elastic prime medium having pressure and expansive force, a play pipe for the reciprocation of a liquid column, a piston in the power chamber, an actuator for actuating the liquid column, means for establishing operative relationship between piston and the actuator, and means for limiting the movement of the actuator.

9. The combination of a play pipe for the reciprocation of a liquid column with a velocity sufficiently limited to preserve the coherence of the column and having sufficient bulk and path of travel in order to acquire useful momentum, a power cylinder for an elastic prime medium having pressure and expansive force, and a piston operating therein.

10. The combination of a play pipe for the reciprocation of a liquid column with a velocity sufficiently limited to preserve the coherence of the column and having sufficient bulk and path of travel in order to acquire useful momentum, a power cylinder for an elastic prime medium having pressure and expansive force, a piston operating therein and an accumulator connected with the play pipe for storing energy during one movement of reciprocation and for giving out energy in connection with a return stroke.

11. The combination of a play pipe for the reciprocation of a liquid column with a velocity sufficiently limited to preserve the coherence of the column and having sufficient bulk and path of travel in order to acquire useful momentum, a power cylinder for an elastic prime medium having pressure and expansive force, a piston operating therein and an accumulator connected with the play pipe for storing energy during a power stroke and for giving out energy to cause a compression stroke.

12. The combination of a play pipe for the reciprocation of a liquid column with a velocity sufficiently limited to preserve the coherence of the column and having sufficient bulk and path of travel in order to acquire useful momentum, a power cylinder for an elastic prime medium having pressure and expansive force and a piston operating therein, the play pipe provided with liquid intake and liquid discharge.

13. The combination of a play pipe for the reciprocation of a liquid column with a velocity sufficiently limited to preserve the coherence of the column and having sufficient bulk and path of travel in order to acquire useful momentum, a power cylinder for an elastic prime medium having pressure and expansive force, and a piston operating therein, the play pipe provided with liquid intake and liquid discharge, an accumulator connected with the discharge and an additional accumulator connected with the play pipe to cause the return stroke of the liquid column.

14. The combination of a play pipe for the reciprocation of a liquid column, a power chamber connected with said play pipe for a primary medium having initial pressure and subsequent expansive force, said chamber provided with an admission valve and an exhaust valve, the exhaust valve arranged to be shut by the impact upon it of liquid flowing into said chamber.

15. The combination of a play pipe for the reciprocation of a liquid column, a power chamber connected with said play pipe for a primary medium having initial pressure and subsequent expansive force, said chamber provided with an admission valve and an exhaust valve, and a valve gear adapted to retard the opening of the exhaust valve and to permit it to be shut by the impact upon it of liquid flowing into said chamber.

16. The combination of a play pipe for the reciprocation of a liquid column, a power chamber connected with said play pipe for a primary medium having initial pressure and subsequent expansive force, said chamber provided with an admission valve and an exhaust valve, a valve gear adapted to permit the exhaust valve to be shut by the impact upon it of liquid flowing into said chamber, and mechanism controlled by said gear whereby the movement of one of the valves shall control the opening movement of the other valve.

17. The combination of a play pipe for the reciprocation of a liquid column, a power chamber connected with said play pipe for a primary medium having initial pressure and subsequent expansive force, said chamber provided with an admission valve and an exhaust valve, a mechanism for controlling said valves comprising means whereby the inlet valve opens under suction and in closing automatically releases the exhaust valve, the exhaust valve adapted to open when the pressure within the chamber has fallen to a suitable extent and to be shut by impact of liquid upon it and in closing to release the admission valve and whereby each valve on shutting is locked as aforesaid.

HERBERT ALFRED HUMPHREY.

Witnesses:
JOSEPH MILLARD,
WALTER J. SKERTEN.